Patented Apr. 10, 1928.

1,666,026

UNITED STATES PATENT OFFICE.

ROBERT APPLEGATE, OF CLEVELAND, OHIO, ASSIGNOR, BY MESNE ASSIGNMENTS, TO THE OHIO BRASS COMPANY, OF MANSFIELD, OHIO, A CORPORATION OF NEW JERSEY.

PROCESS OF WELDING.

No Drawing.  Application filed October 10, 1921.  Serial No. 506,851.

This invention relates to the art of arc welding and is especially concerned with a process of uniting metallic articles by the electric arc involving the use of a degasifying substance.

One object is to provide a substance capable of rendering an arc welded metallic joint substantially free from occluded and combined gases.

Another object is to provide a substance for use in the arc welding process of uniting metals which will prevent an oxidized condition in the solid weld metal.

Another object is to provide a substance for use in the electric arc process of attaching copper bonds to steel rails which is adapted to produce a dense mass of copper substantially free from occluded and combined gases.

Another object is to provide a new and improved process of arc welding non-ferrous articles to ferrous articles comprising as an essential step the subjection of the molten metal to the action of a degasifying substance.

Other objects will be pointed out in the following specification.

Altho my invention relates broadly to the joining of metallic articles by means of the electric arc it will, for purposes of illustration, be described in detail only as applied to the welding of copper bonds to railway rails, the scope of the invention being set forth in the claims appended hereto.

Heretofore certain difficulties have been experienced in securing satisfactory union between copper bonds and steel railway rails. When the bonds are united to the rails by the ordinary process considerable quantities of gases are occluded in and combined with the molten copper and remain entrapped and in combination therein after solidification of the copper. Both the mechanical strength and the electrical conductivity of the joint is thus weakened in proportion to the amount of gases occluded between the adjacent faces of the bond and rail.

By my invention, however, these difficulties are avoided due to the elimination of the occluded and combined gases which is accomplished by the action of a suitable degasifying substance upon the molten copper. Substances which have proven satisfactory for this purpose are calcium silicon, (known commercially as calicum silicide) aluminum, manganese, silicon, calcium and magnesium combined with each other or with copper in varying proportions.

The method of practicing my invention is substantially as follows: A copper bond is positioned adjacent and preferably in contact with a railway rail, it being held in position by a mold composed in part of refractory material. An electric arc is drawn from the bond and rail to an electrode and is caused to play upon the end of the bond thereby melting a portion thereof. I prefer to place a quantity of a suitable degasifying substance, for example, calcium silicon in the mold where it will become intermingled with the molten copper. Additional copper usually in the form of a stick or a rod is melted into the mold until the desired amount of copper has been welded to the bond and rail. During the addition of this extra copper it may become necessary to add further amounts of the degasifying substance in which case the necessary quantities thereof may be dropped or otherwise fed into the molten metal. Obviously the substance could be added in various ways as, for example, by incorporation in the rod which is to be melted into the mold, or by incorporation into the part of the bond which is to be melted.

About 3% by weight of the copper comprising the finished bond head may represent the amount of calcium silicon employed in the production of a satisfactory joint according to my process.

The precise action of the degasifying substance is not thoroughly understood but it is believed that the oxygen and other gases present in the molten metal are caused to unite with the calcium silicon forming silicates and similar substances, thereby leaving the molten metal in a comparatively dense form substantially free from cavities caused by entrapped gases and from non-metallic inclusions and films.

It will be obvious to those skilled in the art that my improved process comprising the use of a degasifying agent can be utilized to advantage in the process of arc welding ferrous articles. There is, however, an additional function which the substance seems to perform in this latter process, viz; that of maintaining a neutral or reducing atmosphere in and around the molten weld metal and thereby protecting it from oxidation and injury from the arc.

While I have set forth my invention in detail as applied to the welding of bonds to railway rails I do not wish to be limited thereto since, as above mentioned, it is also applicable to arc welding in general where unoxidized, dense weld metal is desired. Accordingly I wish my invention to be limited only by the appended claims.

What is claimed is:

1. The process of welding copper bonds to railway rails which comprises disposing a copper bond adjacent a rail, heating the rail and melting a portion of the bond by means of an electric arc, placing a quantity of calcium silicon in contact with the molten bond metal, and melting additional copper to complete the weld.

2. The process of welding copper bonds to railway rails which comprises positioning the end of a bond in a recess in a mold, placing the bond in contact with the rail, placing calcium silicon in the mold recess, heating the rail and melting a portion of the bond by means of an electric arc, and melting additional copper into the mold recess to complete the weld in the presence of calcium silicon.

3. The process of welding metallic articles which comprises positioning the articles in close proximity to one another, melting a portion of the articles in the presence of calcium silicon and causing the molten portions to unite.

4. The process of welding copper bonds to railway rails which comprises positioning a copper bond adjacent a rail, heating the rail and melting a portion of the bond by means of an electric arc, and melting additional copper to complete the weld in the presence of calcium silicon.

5. The process of welding copper and a ferrous metal together which comprises positioning the articles in close proximity to one another, fusing a portion of the articles in the presence of calcium silicon and causing the fused portions to unite.

In testimony whereof I affix my signature.

ROBERT APPLEGATE.